Oct. 12, 1948.

R. E. KLEIN 2,451,394

SELF-ALIGNING CONVEYER ROLL MOUNTING

Filed July 12, 1945

Inventor
Robert E. Klein,
By
Attorney

Patented Oct. 12, 1948

2,451,394

UNITED STATES PATENT OFFICE 2,451,394

SELF-ALIGNING CONVEYER ROLL MOUNTING

Robert E. Klein, West Allis, Wis., assignor to Chain Belt Company, Milwaukee, Wis., a corporation of Wisconsin Application July 12, 1945, Serial No. 604,601

7 Claims. (Cl. 198—202)

The invention relates to conveyer apparatus and the like of the type comprising a traveling endless belt or web, one or both runs of which are engaged or supported at spaced points throughout their length by transversely disposed idler rolls, and it has for its principal object the provision of an improved mounting for such rolls whereby, if for any reason portions of the belt tend to deviate laterally from the normal path of travel, the roll or rolls at such points of misalinement with be automatically shifted in such directions and to such extent as to return the belt to its proper position.

It is well known in apparatus of this kind that if at the points at which the belt runs out of normal alinement, the supporting rolls be shifted to dispose their rotative axes at an angle other than 90° to the direction of belt travel, such rolls will tend to restore the belt to its normal position if the shift is in such direction as to move that end of the roll toward which the belt deviates, forwardly in the direction of belt travel, and/or to move the end of the roll from which the belt moves rearwardly with respect to such travel.

It is also known that if the rolls be tilted from their normal horizontal position transversely of the belt, whereby that end of the roll toward which the belt moves is lowered, and/or the end from which the belt moves is raised, the belt will tend to run toward the higher end of the roll and thus be restored to normal alinement.

Devices making use of each of these principles have been heretofore proposed for correcting belt misalinement, but in many instances they have involved the use of guide rolls or flanges at the ends of the idler rolls, engageable by the edges of the belt as it moves out of alinement, and operable in various ways to shift the idler rolls in the proper direction to restore the belt to normal position. Such guide rolls or flanges however, tend to damage at least the edge portions of the belt, and since the latter may represent up to one half of the cost of the conveyer installation, replacement thereof is an item to be avoided as long as possible.

The present invention provides a simple, effective and relatively inexpensive mounting for the idler rolls whereby, without the use of guide rolls or flanges, such idler rolls will be automatically angularly displaced both vertically and horizontally from their normal positions by the belt as it becomes misalined to either side of its normal path, such displacement in all cases being in the proper directions to restore the belt to such path. The idler rolls are further automatically bodily moved axially of themselves, i. e. transversely of the belt, in the direction of the belt shift, whereby they always completely support the belt throughout its width and do not permit the edge portions thereof to run off or overhang the roll ends, which might be as damaging as the use of guide rolls or flanges. Thus, belts having a width substantially approximating the length of the idler rolls may be employed. The several movements of the idler rolls are all automatically reversed and the rolls returned to their normal positions as the belt becomes realined.

An illustrative embodiment of the invention is shown in the accompanying drawing forming a part of this specification, in which.

Figure 1:
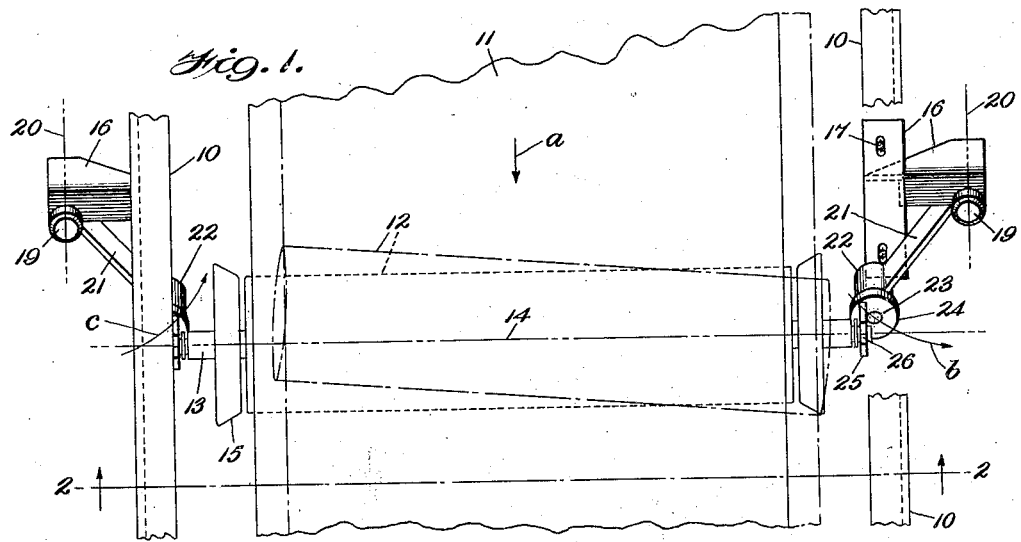
Figure 1 is a plan view of a portion of a typical horizontal belt conveyer installation, equipped with one form of idler roll mounting constructed and arranged in accordance with the invention.

The conveyer installation comprises a supporting frame which includes transversely spaced longitudinal channel members 10 between which the belt 11 travels in the direction indicated by the arrow $a$ in Fig. 1. At suitable points throughout its length the belt run is supported by idler rolls 12 journaled on shafts 13 and the rotative axes 14 of which are normally horizontal and at right angles to the direction of travel of the belt. The shafts 13 sometimes carry counterweighted disks 15 at each end of the rolls, and these may or may not be present since, while the functioning of the present mounting is in no wise dependent upon them, their presence will not interfere with it.

Figure 2:
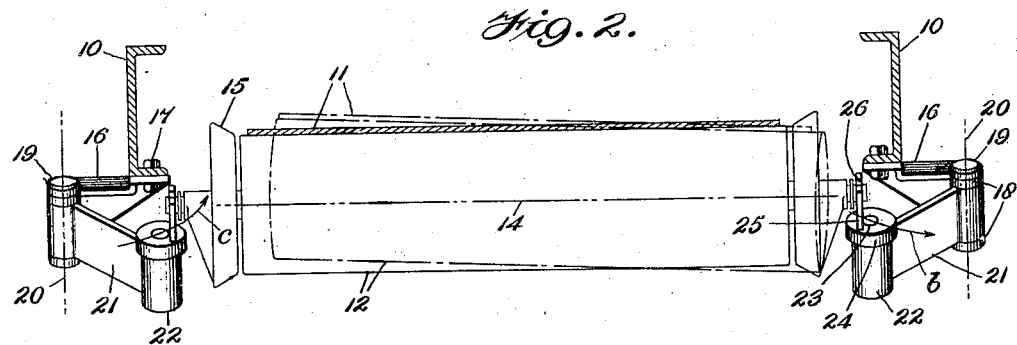
Fig. 2 is a cross sectional view on the plane indicated by the line 2—2 of Fig. 1.
Figure 3:
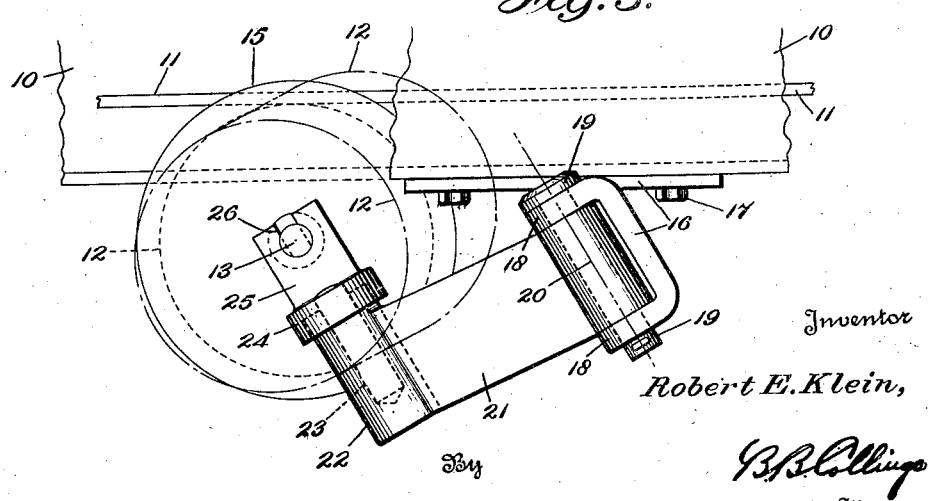
Fig. 3 is an enlarged side elevational view, partly broken away, as seen from the right of Fig. 2.

The mounts, of which there is one for each end of the shaft 13, comprise a bracket 16 secured as by bolts 17 to the under face of the frame member 10, and provided with a pair of spaced angularly disposed ears 18 which carry a pintle 19. As will be clear from the drawing, the axis 20 of this pintle, when viewed as in Figs. 1 and 2, is parallel to the direction of travel of the belt, but when viewed from the side as in Fig. 3, such axis is inclined to the vertical plane, the inclination here shown being approximately 30°. The pintle journals one end of an arm 21, the other end of which is provided with a barrel 22 which journals a pin 23 having a cap 24 surmounted by a lug 25 provided with a slot 26 for receiving and holding the end portion of the roll shaft 13.

The brackets 16 are so constructed and mounted that in the assembled installation the distance between the axes 20 of a complemental pair of pintles 19 is different from, and preferably greater than, the length of the roll shaft 13. Thus, when constructed and assembled as shown in the present drawing, the arms 21 will not only incline downwardly by reason of the inclination of the said axes 20 from the vertical (Fig. 3), but will also be angularly disposed relative to one another (e. g. converge forwardly in the direction of belt travel) by reason of the disposition of the said axes beyond the ends of the shaft 13 (Figs. 1 and 2). The forward inclination of the axes 20 causes the arms, under the influence of gravity, to constantly seek positions parallel to the frame members 10, but they are restrained in such movements by the shorter roll shaft. The system, comprising the roll 12, its shaft 13 and the pair of supporting arms 21, is free to swing transversely of the belt but due to the angular disposition of the axes 20, its orbit is inclined to the horizontal. Since at any point in such orbit other than the normal position shown in full lines in the drawing the center of gravity of the system will be above the lowest point it may attain, the system is pendulously mounted, whereby it will always tend to occupy said normal position.

So long as the belt runs true, as indicated in full lines in Figs. 1 and 2, the roll 12 will maintain its full line position. However, should the belt deviate say to the right, as indicated in broken lines in these figures, the frictional engagement between the belt and the roll surface and/or the shift of the load upon the roll will cause the roll system to swing in the same direction as the belt shifts. This results in the right hand arm 21 swinging outwardly and downwardly, as indicated by the arrows b in Figs. 1 and 2, and the left hand arm moving inwardly and upwardly, as indicated by the arrows c, thus bringing the parts to the broken line positions. When viewed in plan, as in Fig. 1, this shift results in the right hand end of the roll being moved forwardly and its left hand end moved rearwardly with respect to the direction of belt travel; when viewed in front elevation or cross section as in Fig. 2, the right hand end of the roll has been lowered and its left hand end raised; and lastly, the roll has been moved bodily toward the right a distance substantially equal to the lateral deviation of the belt. The first two of these movements have respectively slued the roll horizontally, and tilted it vertically, in the proper directions to cause it to tend to restore the belt to its normal position, while the bodily endwise displacement of the roll has kept it in position to completely support the belt across its full width, and prevented the right hand edge of the belt from running off and overhanging the end of the roll, or sliding upon a dead surface such as that of a counterweight disk 15.

As the belt is restored to its normal and desired path of travel the roll system of course will return to its full line position; and if the belt shifts to the left of normal, movements of the roll system in that direction similar to those above described will take place, with the left hand arm swinging outwardly and downwardly, and the right hand arm moving inwardly and upwardly, as will be readily understood.

It will be noted that by this arrangement all parts of the mounting are at all times disposed outside the lateral limits of the belt and there are no supporting or other members beneath the latter upon which material might lodge and interfere with movements of the roll. Furthermore, the angular disposition of the arms 21 relative to one another, by causing the outer or free ends thereof to travel in relatively different portions of their respective arcuate paths when the arms are swung in the same direction, secures the slueing or horizontal angular displacement of the roll from its normal position, while the forward inclination of the axes of the pintles 19 coupled therewith secures the vertical angular displacement or tilting of the roll transversely of the belt.

Obviously, if the axes 20 of the pintles 19 should be disposed vertically instead of being inclined forwardly (with the arms 21 still being converged), endwise movement of the roll with the belt may be secured accompanied by the horizontal slueing of the roll (Fig. 1), but without the transverse tilting (Fig. 2). Likewise, should the angularity of the axes 20 to the vertical be increased to 90° (or in other words, should these axes be disposed horizontally) it would be possible to secure endwise displacement of the roll accompanied by transverse tilting but without the horizontal slueing. However, since both of these angular displacements will contribute to the return of the belt to its normal position, it is preferred to incline the pintle axes substantially as shown and above described.

While in the present illustrative embodiment the belt is considered as traveling in a horizontal plane, it will be readily understood that the principles of the invention are equally applicable to conveyors having runs disposed at various angles to the horizontal, and that the terms horizontal and vertical used herein are therefore only relative.

What is claimed is:

1. In belt conveyor and like apparatus, having spaced frame members, and a belt arranged to travel between them in a normal path from which it may deviate laterally at times: an arm pivotally mounted on each frame member for swinging movements transversely of the direction of belt travel, the pivotal axes of the arms being inclined in a direction longitudinal of the belt; a shaft engaging and supported by the free ends of said arms, the length of said shaft being less than the distance between the pivotal axes of the arms, whereby to dispose the latter in converging relation; and a belt engaging roll carried by the shaft.

2. A self-alining idler roll mounting for belt conveyors and the like, comprising a bracket for attachment to a frame member adjacent a lateral edge of the belt; an arm pivotally carried by said bracket for swinging movements transversely of the belt; and a roll supporting member carried by the free end of said arm.

3. A self-alining idler roll mounting for belt conveyors and the like, comprising a bracket for attachment to a frame member adjacent a lateral edge of the belt; an arm pivotally carried by said bracket for swinging movements transversely of the belt about an axis which is inclined in a direction longitudinal of the belt; and a pivotal roll supporting member carried by the free end of said arm.

4. In belt conveyer and the like apparatus, a supporting structure; a belt mounted to travel along said structure in a normal longitudinal path from which it may deviate laterally at times; a supporting roll for said belt normally disposed with its rotative axis transverse to the direction of belt travel and parallel to the plane of the belt; and a pair of convergent arms pendulously mounted on said structure and supporting the respective ends of said roll for swinging movements of the latter transversely of the belt, whereby changes in the pressural contact between the belt and the roll longitudinally of the latter due to said deviations of the belt may simultaneously displace the roll axis from its said normal position and bodily move the roll endwise.

5. In belt conveyer and like apparatus, a supporting structure; a belt mounted for travel along said structure in a normal longitudinal path from which it may deviate laterally at times; a supporting roll for said belt normally disposed with its rotative axis transverse to the direction of belt travel and parallel to the plane of the belt; and a pair of downwardly convergent arms pivotally carried by said supporting structure for mounting the respective ends of the roll and pendulously supporting the latter for swinging movements transversely of the belt, whereby changes in the pressural contact between the belt and the roll longitudinally of the latter due to said deviations of the belt may bodily move the roll endwise in the direction of belt deviation and simultaneously therewith tilt the roll to depress the end thereof toward which the belt shifts while raising the other end of the roll.

6. In belt conveyer and like apparatus, a supporting structure; a belt mounted for travel along said structure in a normal longitudinal path from which it may deviate laterally at times; a supporting roll for said belt normally disposed with its rotative axis at substantially right angles to the direction of belt travel and parallel to the plane of the belt; and a pair of pendulously mounted downwardly and forwardly convergent arms carried by said structure and supporting the respective ends of said roll for swinging movements of the latter transversely of the belt, whereby changes in the pressural contact between the belt and the roll longitudinally of the latter due to said deviations of the belt may simultaneously displace the roll endwise in the direction of belt deviation, slue the roll angularly relative to the direction of belt travel, and tilt the roll transversely of the belt.

7. In belt conveyer and like apparatus, comprising spaced frame members, and a belt arranged to travel between them in a normally longitudinal path from which it may deviate laterally at times, the combination of an arm pivotally mounted on each frame member for swinging movements transversely of the direction of belt travel, about axes which are inclined longitudinally of the belt, said arms being angularly disposed relative to one another; and a belt engaging roll disposed between and mounted by said swinging arms.

ROBERT E. KLEIN.

REFERENCES CITED

The following references are of record in the file of this patent:

UNITED STATES PATENTS

| Number | Name | Date |
|---|---|---|
| 1,014,106 | Wentz | Jan. 9, 1912 |
| 1,842,946 | Prins | Jan. 26, 1932 |
| 2,160,057 | Carus et al. | May 30, 1939 |
| 2,169,623 | Weiss et al. | Aug. 15, 1939 |
| 2,355,488 | Kratz | Aug. 8, 1944 |